3,231,598
ESTERS OF THIO ACIDS
Gilbert H. Berezin, East Brunswick, N.J., and Guy H. Harris, Concord, Calif., assignors to The Dow Chemical Company, Midland, Mich., a company of Delaware
No Drawing. Filed Sept. 27, 1961, Ser. No. 140,996
7 Claims. (Cl. 260—455)

The present invention relates to a novel process for preparing S-alkyl and S-aryl esters of β-haloaliphatic thioacids and unsaturated thioacids such as the α,β and/or β,γ derivative and to the novel esters of the thioacids prepared thereby. More particularly the present invention pertains to a direct, simple reaction of an unsaturated aliphatic compound with an alkyl or aryl thiochloroformate and to the novel compounds prepared thereby.

It is well known that an acyl halide will add to olefins under Friedel-Crafts reaction conditions. Further, it is also well known that aliphatic chloroformates will not yield analogous reactions to form alkyl esters of β-haloacids but rather yield $CO_2$, alkyl halide and olefin.

It has now been found that S-alkyl or S-aryl esters of β-halo, β-halo-α,β-unsaturated or α,β-unsaturated aliphatic acids can be prepared by reacting, in the presence of a Friedel-Crafts catalyst, an unsaturated acyclic or cyclic aliphatic compound with an organic thiochloroformate. The reaction proceeds readily when the conditions of reaction are substantially those well known in the Friedel-Crafts reaction conditions. However, the ratio of reactants is not critical, some of the desired product being produced when the reactants are employed in any proportion.

The term "Friedel Crafts catalyst" as herein employed refers to the well known class of metal halides, such as for example the aluminum halides, i.e., $AlCl_3$, $AlBr_3$ and the like, the stannic halides, i.e., stannic tetrachloride, stannic tetrabromide, the ferric halides, i.e., ferric chloride, ferric bromide, the boron halides, i.e., boron trifluoride, and the like.

The thiochloroformates which can be employed in accordance with the present invention are those organic thiochloroformates having the generic formula:

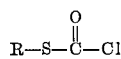

wherein R represents a primary saturated aliphatic radical having from 1 to 18 carbon atoms, aryl or substituted aryl radicals and their halogenated derivatives having no substituent groups reactive under the conditions of reaction. Thus, one can employ alkyl thiochloroformates, arylthiochloroformates, alkarylthiochloroformates, haloarylthiochloroformates, or arylalkylthiochloroformates, nitroarylthiochloroformates and the like. Representative of specific compounds falling within the genus and illustrative of the numerous classes which can be employed are: methyl, ethyl, propyl, butyl, 3-methyl-butyl, pentyl, 3- or 4-methyl pentyl, hexyl, decyl, dodecyl, 3-propyldecyl, 5-butyldecyl, pentadecyl, heptadecyl or octadecyl thiochloroformates, the phenylthiochloroformates, naphthylthiochloroformates, methyl phenyl, dimethyl phenyl, methylnaphthyl, chlorophenyl, dichlorophenyl, nitrophenyl and the like thiochloroformates.

The aliphatic unsaturated reactants are those olefins and alkynes having from 2 to 18 carbon atoms and their halogenated derivatives as well as their substituted derivatives having no substituent reactive under the conditions of reaction. Thus, one can employ ethylene, propylene, the butylenes, pentylenes, hexylenes, octenes, vinyl chloride, acetylene, butyne, propyne, the hexynes, the dodecynes and the like, to name only a few.

The S-esters of the chlorothioacids can be dehydrohalogenated to their corresponding unsaturated acid esters by heating the β-chloro derivative to the dissociation temperature or reacting in the presence of a dehydrohalogenation catalyst such as sodium hydroxide, 2,6-dimethylpyridine and the like.

Some of the new esters are useful as intermediates in the preparation of novel synthetic resins containing a sulfur molecule in the repeating moiety.

The unsaturated acrylic like esters can be homopolymerized or copolymerized with other ethylenically unsaturated organic compounds.

The following examples illustrate the present invention but are not to be construed as limiting:

Example 1.—Preparation of S-methyl β-chlorothiopropionate

S-methyl thiochloroformate (55 grams; 0.5 mole) was added with stirring over a 25 minute period to a slurry of anhydrous aluminum chloride (80 grams; 0.6 mole) in 500 ml. of methylene chloride. The reactor temperature reduced to 0° C. by means of external cooling. Ethylene was rapidly bubbled through the mixture for four hours while the temperature was held at −10° C. The reaction mixture was then poured over an excess of HCl-ice slurry to destroy the $AlCl_3$ complex. The organic layer which formed was separated and dried. The methylene chloride was removed by distillation by heating the organic layer on the steam bath, and the remaining liquid was vacuum distilled at 74–75° C. at 13 mm. Hg. The distilled product was a pale yellow oil and weighed 69 grams (42% of theory).

Analysis.—Calculated for $C_4H_7ClOS$: 25.55% Cl; 23.1% S. Found: 24.85% Cl; 23.5% S.

Example 2.—Preparation of S-methyl trans-β-chlorothioacrylate

In a like manner to Example 1, acetylene was bubbled for 6 hours through a slurry of S-methyl thiochloroformate and $AlCl_3$ in the same quantities. The product was worked up as before, yielding 15 grams of product boiling at 60–64° C. at 20 mm. Hg.

Analysis.—Calculated for $C_4H_5ClOS$: 23.5% Cl; 25.9% S. Found: 23.7% Cl; 26.1% S.

Example 3.—Preparation of S-methyl β-chlorothiocrotonate

In the manner of Example 1 employing $CCl_4$ in place of methylene chloride and methylacetylene in place of ethylene there was obtained a product having a boiling point of 85–93° C. at 27 mm. Hg.

Analysis.—Calculated for $C_5H_7ClOS$: 23.5% Cl; 21.3% S. Found: 23.5% Cl; 20.5% S.

Example 4.—S-methyl 2-chlorocyclohexanethiocarboxylate and S-methyl cyclohexenethiocarboxylate In this example, an equimolar slurry of S-methyl thiochloroformate and tin tetrachloride was prepared in $CS_2$. An equivalent amount of cyclohexene was added at 0–10° C. over a two hour period. The product isolated was found to be a mixture of S-methyl 2-chlorocyclohexane thiocarboxylate and S-methyl cyclohexylenethiocarboxylate; the latter is the product of dehydrohalogenation of the former. This decomposition most likely occurred during the final distillation. The composition of the product was qualitatively determined by infrared spectroscopy.

The novel compounds have been tested and found to be useful as the active ingredient in herbicide compositions. In representative operations seed beds planted to radish seeds were treated with an aqueous solution or dispersion of the active ingredient of Examples 1, 2 or 3. At concentrations as low as 100 parts of active ingredients per million parts of water there was obtained 100% control of the germination of the radish seeds.

*Example 5.—S-methyl thio-2-undecylenate*

To 22 grams of methyl thiochloroformate (0.2 mole and 2.3 ml. of SnCl₄ at 0–10° was slowly added 42 grams of 1-decene (0.2 mole). After six hours it was allowed to come to room temperature, poured on ice and dilute HCl, and extracted with ether. After washing, drying over Na₂SO₄, and filtration the solution was distilled until the overhead temperature reached 130°/0.3 mm. Hg.

The residue was heated on the steam bath for four hours in 50 ml. of 2,6-lutidine and then brought to a boil. After cooling it was poured on dilute sulfuric and ice, taken up in pentane-ether, washed, dried over Na₂SO₄ and filtered. Distillation gave the desired product at 105–8°/2 mm. The product was identified as the α-β isomer by infrared.

*Example 6.—S-propyl thio(methylbutenoate)*

Propyl thiochloroformate (75 grams) was cooled to 3° C. and treated with fused zinc chloride. After stirring for five minutes at 3° C., 55 grams of isobutylene was bubbled in over a period of twenty minutes. The mixture was allowed to come to room temperature and was subsequently stirred for 1.5 hours. The mixture was then poured on a mixture of ice and hydrochloric acid, extracted with ether and the ethereal layer was dried on calcium chloride. The product was distilled at 95–102° C./8 mm. Hg. The product was then dehydrohalogenated by heating it to 105° C. for 20 minutes in 2,6-lutidine. After acidification, the organic layer was taken up in pentane and distilled at 75–75.5° at 2 mm. Hg. The product was then separated on a preparative vapor phase chromatographic instrument. Thus the α,β- and β,γ-isomers were obtained. The α,β isomer,

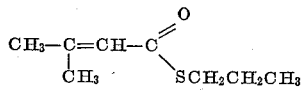

had the following analysis: C, 60.70%; H, 8.78%; S, 20.32%. Theory requires C, 60.72%; H, 8.92%; S, 20.26%. The β,γ-isomer,

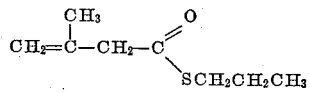

had the following analysis: C, 60.67%; H, 8.59%; S, 20.04%. The β,γ-portion isolated was larger than the α,β-portion.

*Example 7.—S-pentachlorophenyl thioacrylate*

S-pentachlorophenyl thiochloroformate (34.5 grams; 0.11 mole) is slowly added with stirring to a slurry of anhydrous aluminum chloride (15.6 grams; 0.11 mole) in 100 ml. methylene chloride. Ethylene is rapidly bubbled through the mixture for four hours at −10° (external cooling). The reaction mixture is poured on ice and dilute HCl. The organic material is taken up in ether which is then washed with water and dried over anhydrous sodium sulfate. Following filtration and evaporation of the ether, the residue is heated with 50 ml. of 2,6-lutidine at 100° for an hour. This is poured on ice and dilute HCl, taken up in ether (which is washed, dried, and filtered). Evaporation of the ether leaves a residue which by fractional recrystallization from ethanol yields the pentachlorophenyl thioacrylate which melts at about 101–3°.

We claim:
1. A compound having the formula

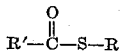

wherein R represents a member selected from the group consisting of primary saturated aliphatic radicals having from 1 to 18 carbon atoms, R′ represents a member selected from the group consisting of olefinic hydrocarbons, β-chloroalkyl, β-chloroalkenyl and acetylenic hydrocarbons having from 2 to 18 carbon atoms.
2. S-methyl β-chlorothiopropionate.
3. S-methyl trans-β-chlorothioacrylate.
4. S-methyl β-chlorothiocrotonate.
5. S-methyl thio-2-undecylenate.
6. S-propyl thio(methylbutenoate).
7. A process for preparing S-esters of aliphatic thio acids comprising reacting in the presence of a Friedel-Crafts catalyst, an aliphatic hydrocarbon selected from the group consisting of olefins and acetylenes having from 2 to 18 carbon atoms and cyclohexene with a thiochloroformate having the formula:

R—S—C(O)Cl wherein R represents a member selected from the group consisting of primary saturated aliphatic radical having from 1 to 18 carbon atoms, phenyl, naphthyl, methyl phenyl, dimethyl phenyl methylnaphthyl chlorophenyl, dichlorophenyl, and nitrophenyl.

References Cited by the Examiner

UNITED STATES PATENTS

| | | | |
|---|---|---|---|
| 2,402,560 | 6/1946 | Langkammerer | 260—455 |
| 2,458,075 | 1/1949 | Himel | 260—455 |
| 2,509,483 | 5/1950 | Crouch | 260—455 |

OTHER REFERENCES

Imperial Chemical Industries Ltd. (Australia), May 14, 1957, 7 pages.

CHARLES B. PARKER, *Primary Examiner.*

DANIEL D. HORWITZ, *Examiner.*